March 13, 1928.   1,662,542
J. D. SHORT
SPRING WHEEL
Filed June 20, 1927
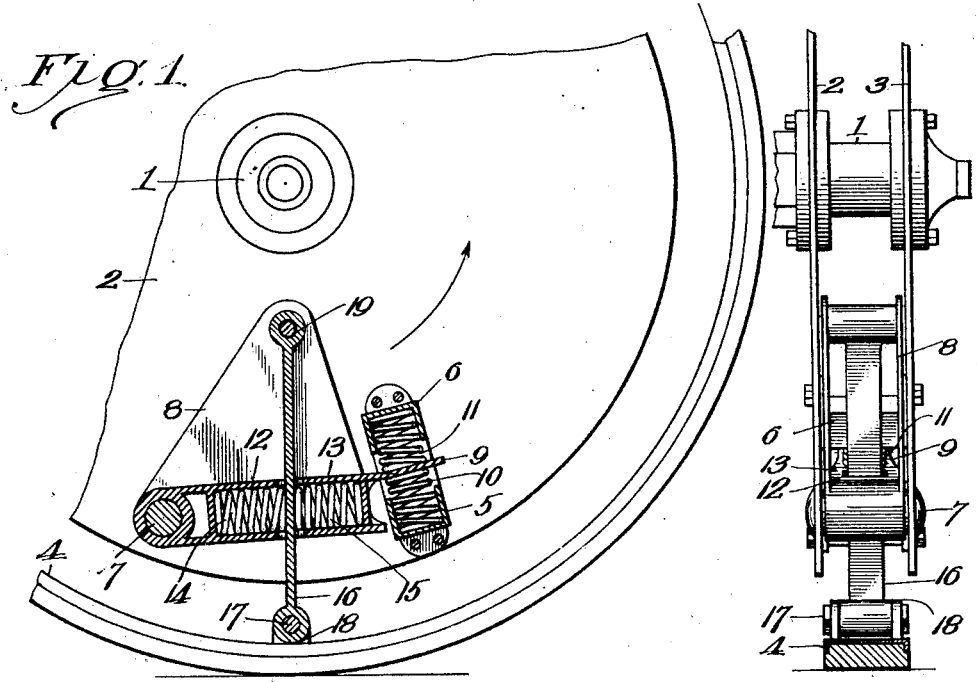
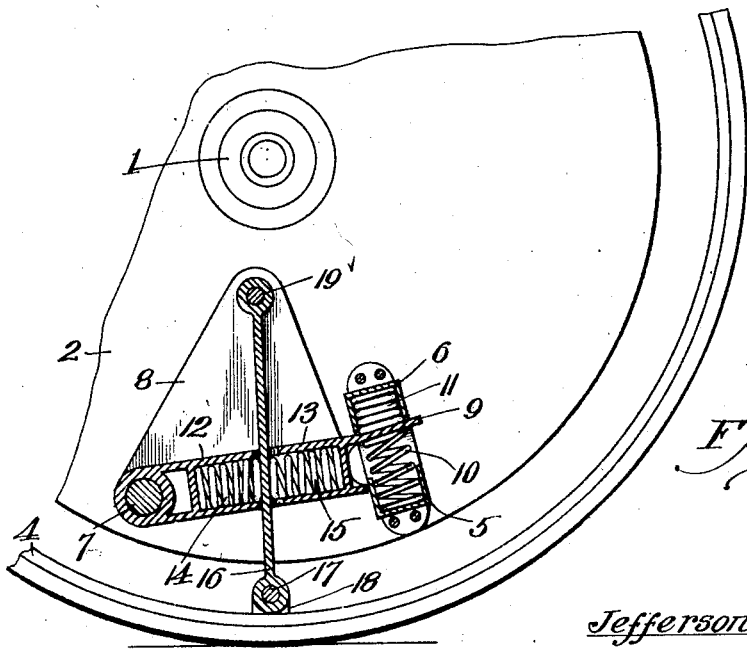
INVENTOR.
Jefferson D. Short
BY
Thorpe & Thoepe ATTORNEYS.

Patented Mar. 13, 1928.

1,662,542

UNITED STATES PATENT OFFICE.

JEFFERSON D. SHORT, OF ALBUQUERQUE, NEW MEXICO.

SPRING WHEEL.

Application filed June 20, 1927. Serial No. 200,023.

This invention relates to cushion wheels of that class having the property of absorbing shocks incident to travel over rough roads and in starting and stopping. There have been numerous wheels of this class but none, as far as I am aware, that have proven sufficiently efficient and practical as to have found a place in the commercial world, on the ground of intricacy and weakness of construction and durability, susceptibility to buckling under laterally-applied strain, and also because of producing unusual and loud noises in operation, and of presenting an uncouth appearance because of the exposure of numerous springs within the circle of the wheel.

My objects therefore are to provide a cushion wheel which will possess maximum strength and durability as regards its load carrying capacity and resistance to buckling action under laterally applied strain; which will operate under all conditions of load or strain without producing clicking or rattling sounds, and which is conventional in appearance with the ordinary rigid disk wheel in common use.

With these objects in view the invention consists in certain novel and useful features of construction and combinations of parts as hereinafter described and claimed; and in order that it may be fully understood, reference is to be had to the accompanying drawing, in which:—

Figure 1 is a fragmentary view of a wheel embodying the invention with the disks concentric relative to the rim, the near disk being broken away to disclose one of the cushioning mechanisms and the latter being shown in section.

Figure 2 is a similar view but with the parts positioned as when carrying weight, that is with the disks and parts carried thereby depressed and hence in eccentric relation to the rim, the inner end of the spoke occupying a position slightly to one side of a radial plane passing through the axis of the wheel and the outer end of the spoke.

Figure 3 is an edge view of the wheel as it appears in Figure 1.

In the said drawing, 1 indicates the hub of a wheel, either of the steering or driving type, and secured rigidly to the hub in spaced relation is a pair of disks 2 and 3 of diameter to nearly correspond to the inner diameter of the wheel rim 4 which surrounds them and is provided with a tire, shown in this instance as a conventional solid rubber tire, as the wheels of the invention are designed primarily for use on trucks, though not restricted solely to such use.

Between and rigidly connecting the disks, preferably near their outer edges to insure rigid relationship between them, will be arranged around the hub, a suitable number of pairs of facing sockets 5 and 6, one pair only being shown. The sockets are spaced apart, but are preferably of integral construction for greater strength and ease of assembly. The pairs of sockets 5 and 6 extend generally in a direction radial of the wheel. Rigidly connecting and bracing the disks, and pivoted on each bolt 7 is a casing 8. The casings 8 are of generally triangular form in side view and narrower than the space between the disks so as to be capable of pivotal or oscillatory movement without abrasion or contact with the disks. The casings have arms or extensions 9, at the sides opposite their pivotal points, which arms project through the spaces between the sockets 5 and 6. Received within said sockets and applying inward and outward pressure respectively on the arm 9, are springs 10 and 11, one spring tending to resist outward movement of the wheel hub and the other to resist reverse movement.

The casing is provided with a pair of spaced sockets 12 and 13, containing springs 14 and 15 applying pressure upon opposite sides of a flat spoke 16 interposed between them and extending generally in a radial direction with respect to the wheel, each spoke being pivoted at 17 at its outer end to and between a pair of lugs 18, projecting inwardly from the sides of the rim. At the inner end each spoke is pivoted at 19 to the apex of the casing at a point between the sockets of the casing and the hub of the wheel.

When the wheel is at rest, the load or weight of the car will cause the center of the wheels to fall slightly below the center of the rim. This will cause the disks to move likewise and the casing at that time below the axis of the wheel, will rock and swing its apex in the direction of the radial plane of the pivot bolt 7, forming the axis of such movement, this pivotal action occurring because the spoke, fixed to the rim upon the ground, cannot move downward and hence must swing in the direction mentioned with respect to the apex of the casing. As a result of the pivotal action of the casing and spoke, spring 14 is compressed and hence cushions the downward movement of the hub and disks, and cooperating in offering yielding resistance to such movement by spring 14, spring 11 in socket 6 applies increased pressure on arm 9, as the pivotal movement of the casing to the left on the pivot bolt, causes the arm 9 to move relatively upward.

It will be understood likewise, that upward or rebound movement of the hub and disks relative to the rim, will reverse the action described, that is, will cause reverse pivotal movement of the casing and spoke and cause such elements to press against the other springs 15 and 10 respectively. It will thus be seen that two springs always cooperate in resisting downward movement and the other two springs cooperate in opposing upward or rebounding movement. It will also be understood that this cooperative action is common to all of the cushion appliances around the wheel, but that the springs which oppose downward movement of the hub when below the axis of the latter, offer no resistance to such movement when above the hub, and that the springs 15 and 10 which are relatively functionless when below the axis of the hub, offer resistance to such downward movement when above the axis of the hub. This reversal of functional action also applies with respect to the cushion appliances when in a horizontal plane through the axis of the hub, but at different sides thereof. It will likewise be apparent that the springs perform alternately the different functions described according to the direction in which the wheel turns, that is to say, referring to the appliance when below the hub, if the latter turns in the direction indicated by the arrow, Figure 1, the springs 14 and 11 function to yieldingly resist downward movement and transfer of power from the disks to the rim, whereas if the wheel movement is reversed, as in backing, the other pair of springs yieldingly resist such downward movement and transfer of power.

From the above description, it will be apparent that I have produced a device embodying the features of advantage set forth as desirable in the statement of the object of the invention, and which may be modified in various particulars without departing from the spirit and scope of the appended claims.

I claim:

1. A cushion wheel comprising a hub, a disk secured thereto, a rim surrounding the disk, a plurality of casings pivoted to the disk and each provided with an arm extending transversely of a radial plane of the wheel, means carried by said disk and adapted for yieldingly applying inward and outward force on each of said arms, spokes extending in a direction generally radial of the wheel and each pivoted at its outer end to the rim and at its inner end to a casing, and means carried by the casings and adapted to apply yielding force on the spokes tending to oscillate the same in opposite directions in a plane transverse with respect to the axis of the wheel.

2. A cushion wheel comprising a hub, a disk secured thereto, a rim surrounding the disk, a plurality of casings pivoted to the disk and each provided with an arm extending transversely of a radial plane of the wheel, a plurality of pair of springs carried by the disk and applying inward and outward force on their respective arms, spokes extending in a direction generally radial of the wheel and each pivoted at its outer end to the rim and at its inner end to a casing, and springs carried by the casing and applying force on the spokes tending to oscillate the same in opposite directions in a plane transverse with respect to the axis of the wheel.

3. A cushion wheel comprising a hub, a disk secured thereto, a rim surrounding the disk, a plurality of pairs of spaced facing sockets secured to the disk, a plurality of casings pivoted to the disk and each provided with an arm extending transversely of a radial plane of the wheel and between a pair of said sockets, springs in the sockets respectively applying inward and outward pressure on an arm, spokes extending in a direction generally radial of the wheel and each pivoted at its outer end to the rim and at its inner end to a casing at a point nearer to the axis of the wheel than the pivotal point of the respective casing on the disk, and a pair of springs carried by each casing and applying force in opposite directions on their respective spokes.

4. A cushion wheel comprising a hub, spaced disks secured to the hub, a rim surrounding the disks, a plurality of pairs of spaced facing sockets secured to and between the disks, a casing pivoted to and between the disks opposite the space between each pair of sockets, and each provided with an arm extending between the sockets, spokes extending in a direction generally radial of the wheel and through a casing and pivotally connected at the outer end to the rim and at the inner end to the casing, and springs within each casing and bearing at their remote ends against their respective casings and at the other ends against opposite faces of their respective spokes.

5. A cushion wheel comprising a hub, spaced disks secured to the hub, a rim surrounding the disks, casings pivoted to and between the disks so that their free ends shall be capable of moving toward and from the axis of the wheel, and each provided at its free end with an arm, springs carried by and between the disks inward and outward of said arms and applying force tending to swing their respective casings in opposite directions, spokes pivoted at their outer ends to the rim and at their inner ends to a casing at a point nearer to the axis of the wheel than the pivotal point of their respective casings, and yielding means carried by each casing and bearing against their respective spokes at opposite sides thereof and tending to swing the spoke in a plane transverse with respect to the axis of the wheel.

6. A cushion wheel comprising a hub, a disk secured thereto, a rim surrounding the disk, casings pivoted to the disk, spokes pivoted at their outer ends to the rim and at their inner ends to a casing in a different radial plane and at a lesser distance from the axis of the wheel than the pivotal point of their respective casings, means applying yielding force tending to resist outward swinging movement of each casing, and other means applying yielding force tending to resist inward swinging movement of each casing.

In testimony whereof I affix my signature.

JEFFERSON D. SHORT.